(12) United States Patent
Chang et al.

(10) Patent No.: US 7,952,264 B2
(45) Date of Patent: May 31, 2011

(54) LAMP MODULE FOR PROJECTOR

(75) Inventors: Fan-Chieh Chang, Hsin-Chu (TW); I-Ming Liu, Hsin-Chu (TW); Wen-Yi Su, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 252 days.

(21) Appl. No.: 12/269,872

(22) Filed: Nov. 12, 2008

(65) Prior Publication Data
US 2009/0289538 A1 Nov. 26, 2009

(30) Foreign Application Priority Data
May 26, 2008 (TW) ................................ 97119421 A

(51) Int. Cl.
*H01J 5/50* (2006.01)
*H01J 1/88* (2006.01)
(52) U.S. Cl. ..................................... 313/318.01; 313/51
(58) Field of Classification Search .................... 313/51, 313/318.01
See application file for complete search history.

(56) References Cited

U.S. PATENT DOCUMENTS

| 4,958,429 | A  | * | 9/1990 | Forish et al. | 29/877 |
| 6,467,942 | B2 | * | 10/2002 | Alloway et al. | 362/549 |
| 2006/0232982 | A1 | * | 10/2006 | Tsai | 362/371 |
| 2006/0239036 | A1 | * | 10/2006 | Tsai | 362/655 |

* cited by examiner

*Primary Examiner* — Karabi Guharay
(74) *Attorney, Agent, or Firm* — Jianq Chyun IP Office

(57) ABSTRACT

A lamp module suitable for a projector has an insulating base, a lamp, electrode lines, electrode terminals, electrode strips, conductive lines, an electrical connector and conductive terminals. The lamp is mounted on the insulating base. Each of the electrode lines has an end connected to the lamp. The electrode terminals are respectively connected to the other ends of the electrode lines. Each of the electrode strips has a first end and a second end, wherein the electrode terminals and the first ends are fastened on the insulating base, and the electrode terminals respectively contact the first ends. The electrical connector is connected to one ends of the conductive lines. The conductive terminals are respectively connected to another ends of the conductive lines. The conductive terminals and the second ends herein are fastened on the insulating base, and the conductive terminals respectively contact the second ends.

9 Claims, 4 Drawing Sheets

LAMP MODULE FOR PROJECTOR

CROSS-REFERENCE TO RELATED APPLICATION

This application claims the priority benefit of Taiwan application serial no. 97119421, filed on May 26, 2008. The entirety of the above-mentioned patent application is hereby incorporated by reference herein and made a part of specification.

BACKGROUND OF THE INVENTION

1. Field of the Invention

The present invention generally relates to a lamp module, in particular, to a lamp module suitable for a projection device.

2. Description of Related Art

A projector is a digital display device having a high resolution the same as a computer screen or a television screen. A projector is suitable to project images to produce a large-dimension frame without any difficulty in a given projection space. A projector works based on an imaging principle that a lamp module produces a light beam, the light beam strikes a light valve to produce an image beam and then the image beam is projected onto a projection screen or a wall surface. Since the lamp module is a consumptive ware, the lamp module occupies the most part in a total maintain cost of a projector.

FIG. 1 is a perspective view of a conventional lamp module. Referring to FIG. 1, a lamp module 100 has an insulating base 102 and a lamp 104 disposed on the insulating base 102, wherein the insulating base 102 is connected to a female connector 108 via a pair of first cords 106. In addition, an end of each of a pair of second cords 112 is connected to an electrical connector 114, and the other end of each of the pair of second cords 112 is connected to a male connector 116. The male connector 116 is connected to the female connector 108, and the electrical connector 114 is connected to a lamp driver of a projector (not shown).

During replacing the lamp 104, the female connector 108 is detached from the male connector 116 and then the insulating base 102, the lamp 104 on the insulating base 102, the pair of first cords 106 and the female connector 108 are replaced. However, the first cords 106 used for the lamp module 100 require a female connector 108 in specific specification, and the second cords 112 require also a male connector 116 in the specific specification to connect the female connector 108. In addition, the first cords 106 and the second cords 112 may be high-voltage-proof and high-temperature-proof, so that the chosen cords may meet a special and unique specification. The lamp 104 is connected to the pair of first cords 106 by using a pair of fixing structures of electrode lines, wherein the fixing structures of electrode lines are respectively covered by an plastic insulator 106a located at the ends of the pair of first cords 106. In short, the conventional lamp module 100 requires a more expensive cost.

SUMMARY OF THE INVENTION

Accordingly, the present invention is directed to a lamp module for reducing the cost.

An embodiment of the present invention provides a lamp module suitable for a projector. The lamp module includes an insulating base, a lamp, a plurality of electrode lines, a plurality of electrode terminals, a plurality of electrode strips, a plurality of conductive lines, an electrical connector and a plurality of conductive terminals. The lamp is mounted on the insulating base. Each of the electrode lines has an end connected to the lamp. The electrode terminals are respectively connected to the other ends of the electrode lines. Each of the electrode strips has a first end and a second end, wherein the electrode terminals and the first ends are fastened on the insulating base, and the electrode terminals respectively contact the first ends. The electrical connector is connected to one ends of the conductive lines. The conductive terminals are respectively connected to the other ends of the conductive lines. The conductive terminals and the second ends herein are fastened on the insulating base, and the conductive terminals respectively contact the second ends to make the lamp electrically connected to the electrical connector.

In an embodiment of the present invention, the above-mentioned electrode line is a metal bare wire.

In an embodiment of the present invention, the above-mentioned electrode terminal is a ring terminal.

In an embodiment of the present invention, the above-mentioned insulating base has a plurality of grooves and the electrode strips are respectively disposed in the grooves.

In an embodiment of the present invention, the above-mentioned electrode strip is in U-shape.

In an embodiment of the present invention, the above-mentioned conductive terminal is a ring terminal.

In an embodiment of the present invention, the above-mentioned lamp module further includes a plurality of first fixing screws, which respectively go through the electrode terminals and the first ends to fasten the electrode terminals and the first ends on the insulating base.

In an embodiment of the present invention, the above-mentioned lamp module further includes a plurality of second fixing screws, which respectively go through the conductive terminals and the second ends to fasten the conductive terminals and the second ends on the insulating base.

In an embodiment of the present invention, the above-mentioned second fixing screws have different specifications.

In an embodiment of the present invention, the above-mentioned conductive lines have different lengths.

In the embodiments of the present invention, since the employed cords and terminals are common ones instead of the cords and connectors in special and unique specifications in the prior art, the conventional design is simplified and the cost is reduced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
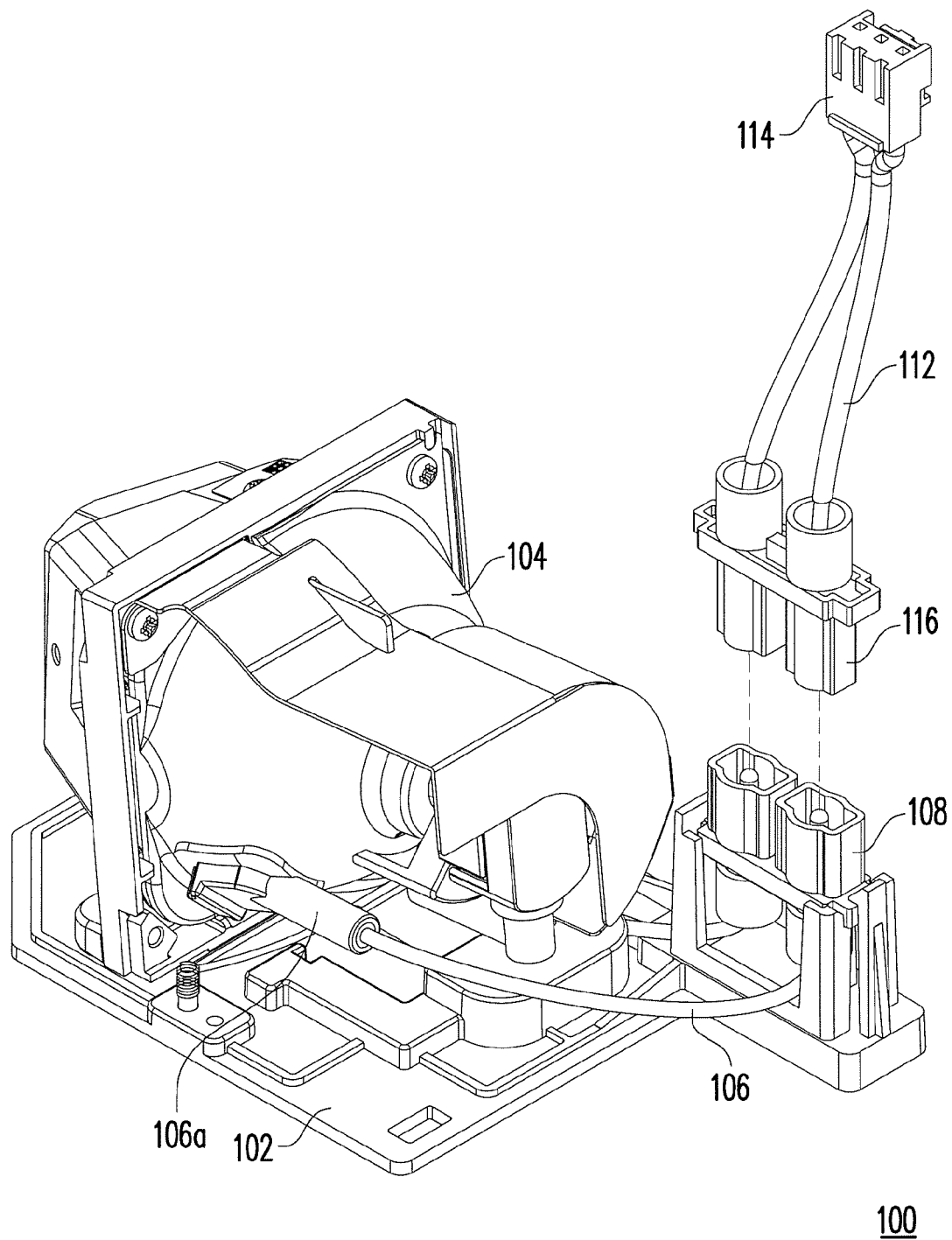
FIG. 1 is a perspective view of a conventional lamp module.
Figure 2:
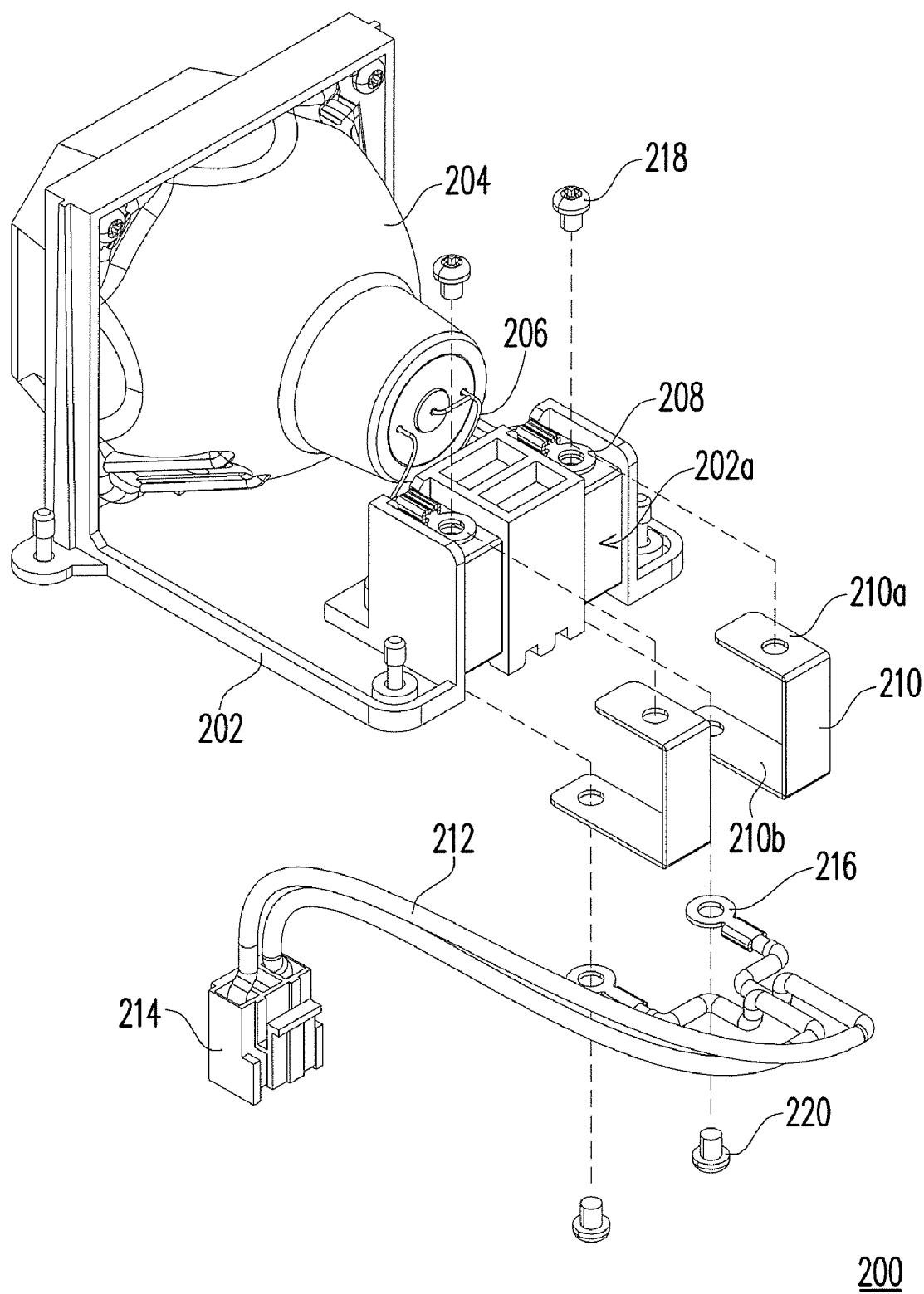
FIG. 2 is a perspective view of a lamp module prior to assembling according to an embodiment of the present invention.
Figure 3:
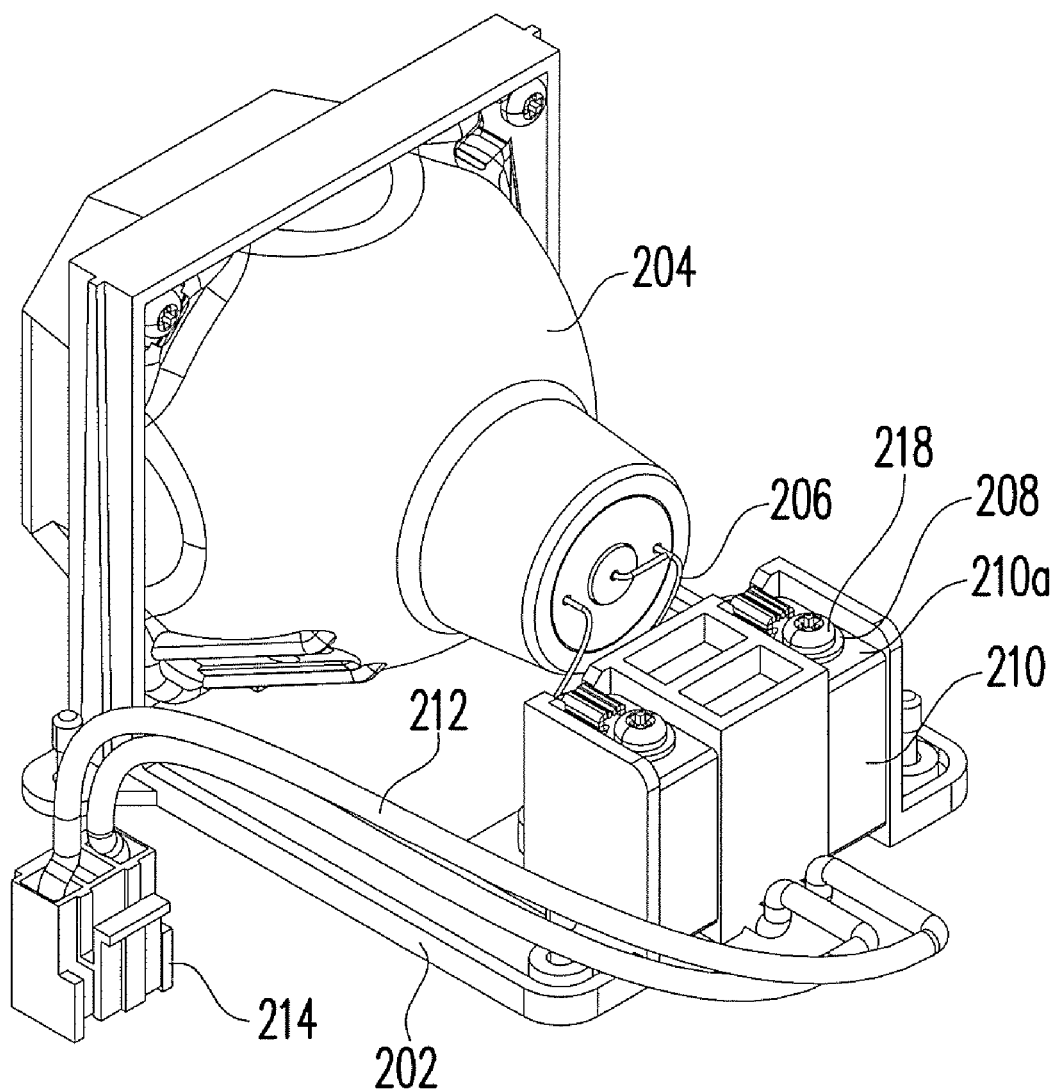
FIG. 3 is a perspective view of the lamp module in FIG. 2 after assembling.

FIG. 2 is a perspective view of a lamp module prior to assembling according to an embodiment of the present invention and FIG. 3 is a perspective view of the lamp module in FIG. 2 after assembling. Referring to FIGS. 2 and 3, a lamp module 200 of the embodiment is suitable for a projector (not shown). The lamp module 200 has an insulating base 202, a lamp 204, a plurality of electrode lines 206, a plurality of electrode terminals 208 and a plurality of electrode strips 210. The lamp 204 is mounted on the insulating base 202, the electrode lines 206 respectively have an end connected to the lamp 204, and the electrode terminals 208 are respectively connected to another end of each electrode line 206. In the embodiment, the electrode lines 206 are metal bare wires. In addition, each of the electrode strips 210 respectively has a first end 210a and a second end 210b, as shown in FIG. 2. The electrode terminals 208 and the first ends 210a are fastened on the insulating base 202, and the electrode terminals 208 respectively contact each of the first ends 210a, as shown in FIG. 3.

In the embodiment, the electrode terminals 208 may be ring terminals. The insulating base 202 in the embodiment may have a plurality of grooves 202a and the electrode strips 210 are respectively disposed in the grooves 202a. In addition, the electrode strips 210 in the embodiment may be in U-shape so as to be inserted into the grooves 202a of the insulating base 202.

Figure 4:
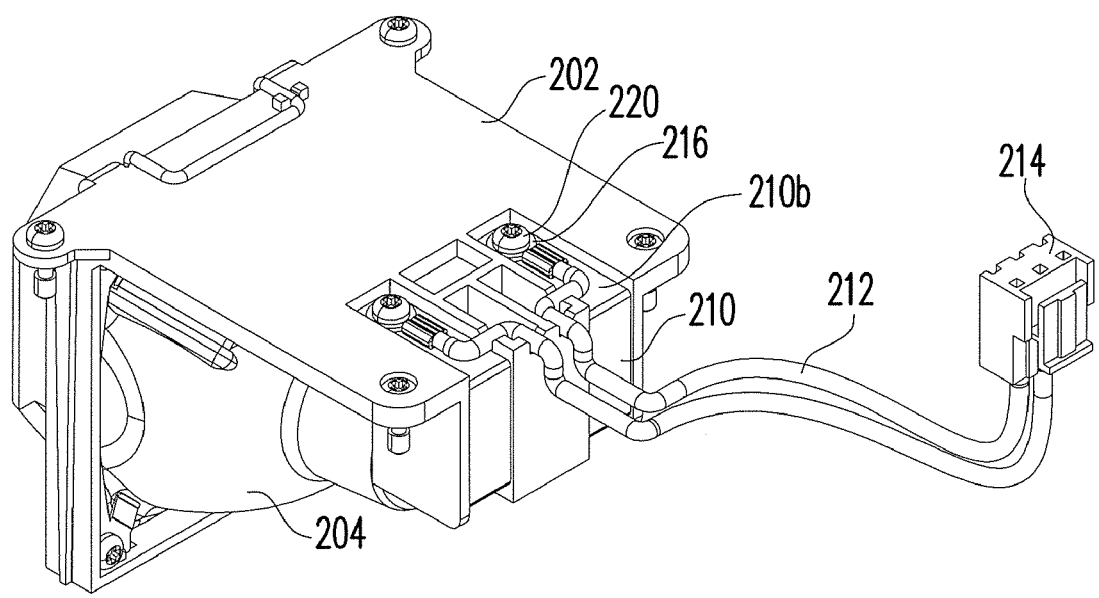
FIG. 4 is a perspective view from another viewpoint of the lamp module in FIG. 2 after assembling.

FIG. 4 is a perspective view from another viewpoint of the lamp module in FIG. 2 after assembling. Referring to FIG. 4, for electrically connecting the lamp module to a lamp driver of the projector (not shown), the lamp module 200 further has a plurality of conductive lines 212, an electrical connector 214 and a plurality of conductive terminals 216. The electrical connector 214 is respectively connected to an end of each conductive line 212 and the conductive terminals 216 are respectively connected to the other ends of the conductive lines 212. In addition, the conductive terminals 216 and the second ends 210b are fastened on the insulating base 202, and the conductive terminals 216 respectively contact the second ends 210b to make the lamp 204 electrically connected to the electrical connector 214, as shown in FIG. 4. In the embodiment, the conductive terminals 216 are ring terminals.

Referring to FIGS. 2 and 3, in the embodiment, the lamp module 200 further has a plurality of first fixing screws 218, which respectively go through the electrode terminals 208 and the first ends 210a so as to fasten the electrode terminals 208 and the first ends 210a on the insulating base 202, as shown in FIG. 3.

Referring to FIGS. 2 and 4, in the embodiment, the lamp module 200 further has a plurality of second fixing screws 220, which respectively go through the conductive terminals 216 and the second ends 210b so as to fasten the conductive terminals 216 and the second ends 210b on the insulating base 202, as shown in FIG. 4.

In order to conduct assembling process in dummy way to prevent wrongly wiring the positive terminal and the negative terminal of the electrical connector 214, in the embodiment, the second fixing screws 220 have different specifications or the conductive lines 212 have different lengths, which are used to distinguish different fastening positions for the conductive terminals 216 and the corresponding second ends 210b of the electrode strips 210. For example, in response to different specifications of the second fixing screws 220, the second ends 210b of the electrode strips 210 and the conductive terminals 216 may be designed to fit the second fixing screws 220 in the different specifications, so that the conductive terminals 216 and the second fixing screws 220 in the same specification are fastened on the corresponding second ends 210b. Similarly, when the conductive lines 212 have different lengths, a shorter conductive line 212 and a longer conductive line 212 would respectively connect one of the second ends 210b and another second end 210b depending on the different distances. Once the lamp 204 wrongly connects the positive terminal and the negative terminal of the electrical connector 214, the above-mentioned designs prevent the successive electrically connecting.

In summary, since the employed cords and terminals in the embodiments of the present invention are common ones instead of the cords and connectors in special and unique specifications in the prior art, therefore, the conventional design is simplified and the cost is reduced.

It will be apparent to those skilled in the art that various modifications and variations may be made to the structure of the present invention without departing from the scope or spirit of the embodiments of the invention. In view of the foregoing, it is intended that the present invention cover modifications and variations of this invention provided they fall within the scope of the following claims and their equivalents. In addition, any one of the embodiments of the present invention or any one of the claims is not necessarily to achieve all the objectives, all the advantages or all the features disclosed by the present invention. Moreover, the abstract of the disclosure and the title are intended to aid patent searching, not to limit the claim scope of the present invention.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lamp module, suitable for a projector, the lamp module comprising:
   an insulating base;
   a lamp, mounted on the insulating base;
   a plurality of electrode lines, each thereof having an end connected to the lamp;
   a plurality of electrode terminals, respectively connected to the other ends of the electrode lines;
   a plurality of electrode strips, each thereof having a first end and a second end, wherein the electrode terminals and the first ends are fastened on the insulating base, and the electrode terminals respectively contact the first ends;
   a plurality of conductive lines;
   an electrical connector, connected to one ends of the conductive lines;
   a plurality of conductive terminals, respectively connected to another ends of the conductive lines, wherein the conductive terminals and the second ends are fastened on the insulating base, and the conductive terminals respectively contact the second ends to make the lamp electrically connected to the electrical connector; and
   a plurality of second fixing screws, respectively going through the conductive terminals and the second ends to fasten the conductive terminals and the second ends on the insulating base.

2. The lamp module according to claim 1, wherein the electrode line comprises a metal bare wire.

3. The lamp module according to claim 1, wherein the electrode terminal comprises a ring terminal.

4. The lamp module according to claim 1, wherein the insulating base has a plurality of grooves and the electrode strips are respectively disposed in the grooves.

5. The lamp module according to claim 1, wherein the electrode strip is in U-shape.

6. The lamp module according to claim 1, wherein the conductive terminal comprises a ring terminal.

7. The lamp module according to claim 1, further comprising:
   a plurality of first fixing screws, respectively going through the electrode terminals and the first ends to fasten the electrode terminals and the first ends on the insulating base.

8. The lamp module according to claim 1, wherein the second fixing screws have different specifications.

9. The lamp module according to claim 1, wherein the conductive lines have different lengths.

* * * * *